May 23, 1933.   P. WEIEN   1,910,869
SWITCH MECHANISM
Filed April 4, 1928   3 Sheets-Sheet 1
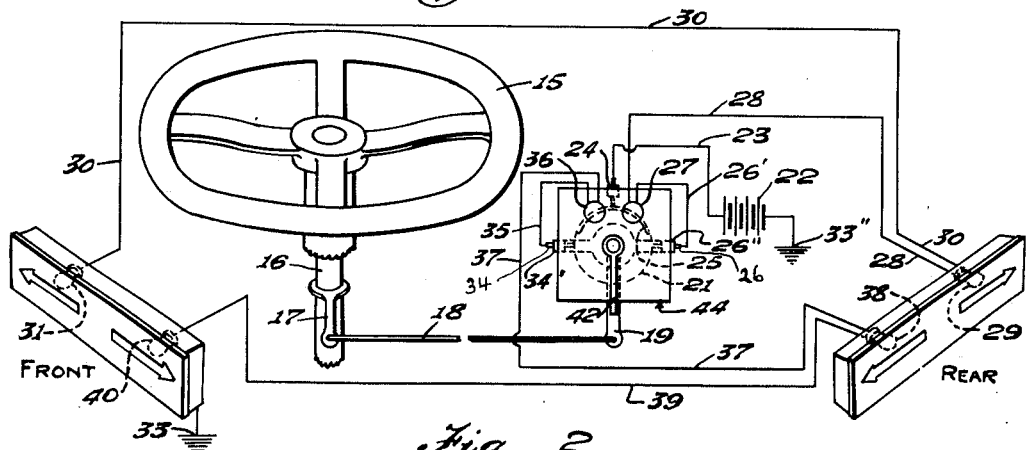
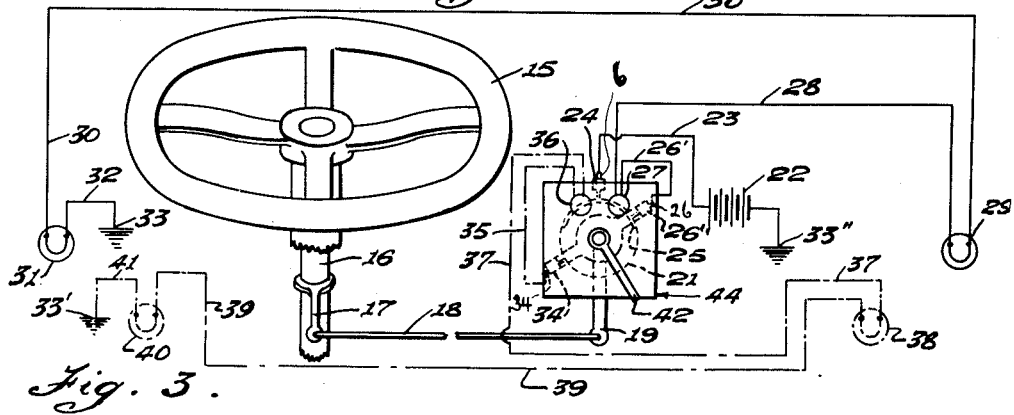
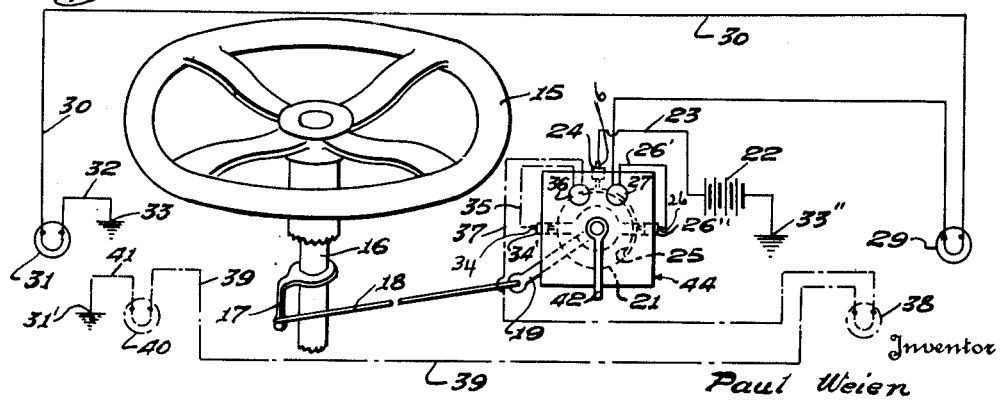
Inventor
Paul Weien
By Percy H. Moore
Attorney May 23, 1933.　　　P. WEIEN　　　1,910,869
SWITCH MECHANISM
Filed April 4, 1928　　　3 Sheets-Sheet 2

Inventor
Paul Weien
By Percy H. Moore
Attorney

Patented May 23, 1933

1,910,869

UNITED STATES PATENT OFFICE

PAUL WEIEN, OF LANCASTER, PENNSYLVANIA, ASSIGNOR OF ONE-HALF TO HENRY S. RICH, JR., OF MARIETTA, PENNSYLVANIA

SWITCH MECHANISM

Application filed April 4, 1928. Serial No. 267,285.

This invention relates to circuit closers for automobile signaling systems which indicate to approaching or overtaking vehicles by means of appropriately marked front and rear lamps the direction which the operator is about to take.

One object of the invention is to provide a circuit closer for automobile signaling systems whereby pilot signals on the dash and direction signals located at the front and rear of an automobile may be actuated either by manipulation of a hand lever or automatically through the steering mechanism.

Another object of the invention is to provide a manually operable circuit closer for automobile signaling systems which permits indication of the direction about to be taken by the automobile and which is actuated upon by the steering mechanism for automatically restoring the circuit closer to normal position.

Other and more specific objects and advantages of my invention will be apparent as the specification is considered in connection with the accompanying drawings, in which Figure 1 is a diagrammatic view of my improved signal showing the various operative parts in neutral or normal position;

Figure 2 is a view similar to that shown in Figure 1, showing the manually operated means moved to right turn position for energizing one set of signals, as indicated in full lines;

Figure 3 is a view similar to that of Figures 1 and 2 but showing in full lines the energized signals, as controlled by the steering mechanism when the latter is moved to right turn position;

Figure 4:
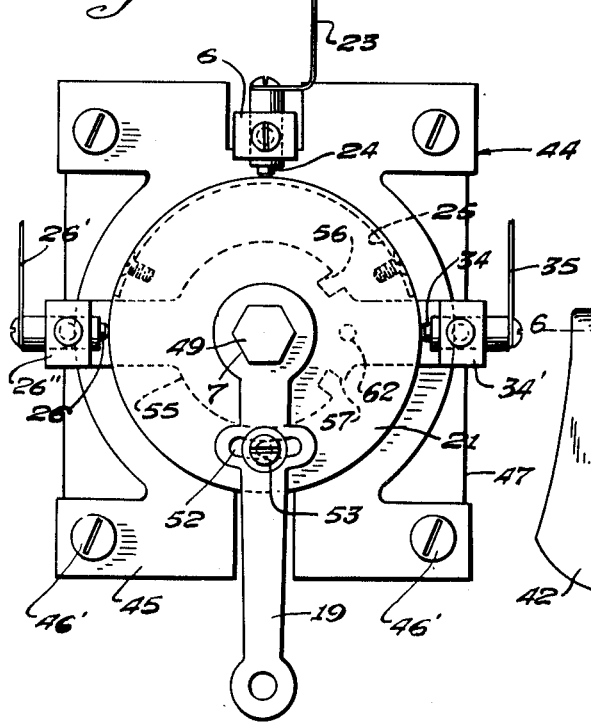
Figure 4 is a rear elevation of the switch mechanism in normal inoperative position.
Figure 5:
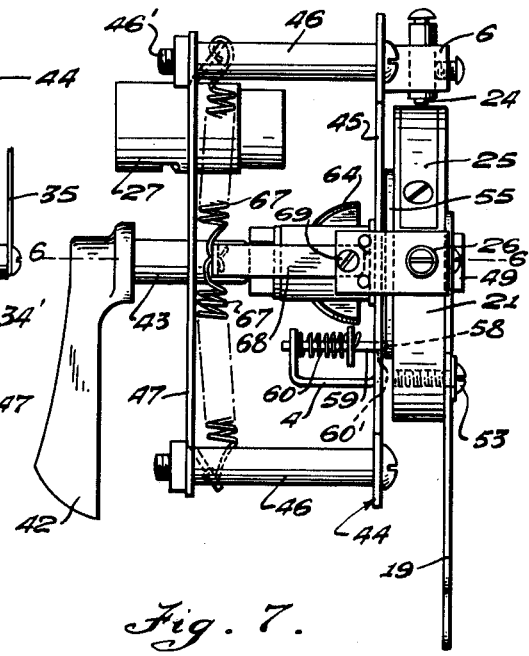
Figure 5 is a side elevation thereof.
Figure 6:
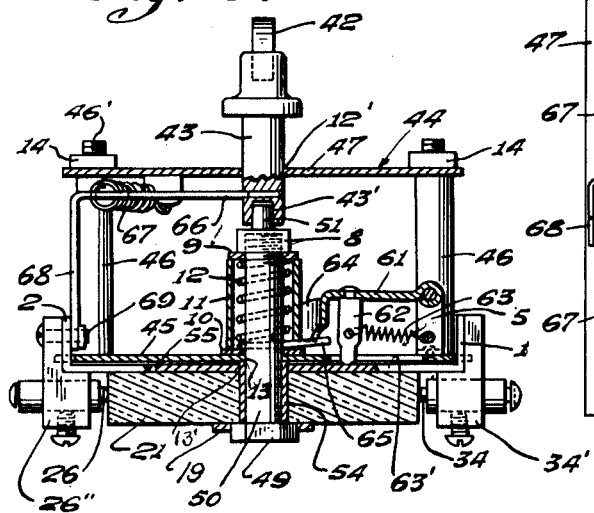
Figure 6 is a plan view partly in section taken along the line 6—6 of Figure 5.
Figure 7:
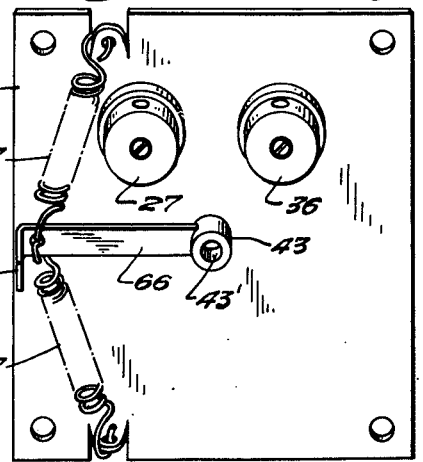
Figure 7 is a rear elevation of the front plate of the switch mechanism.
Figure 8:
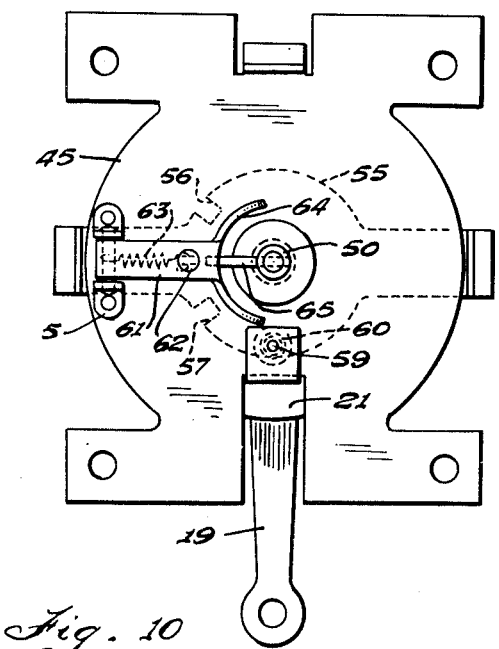
Figure 8 is a front elevation of the rear plate of the switch mechanism showing the operative parts thereof in normal inoperative position.
Figure 9:
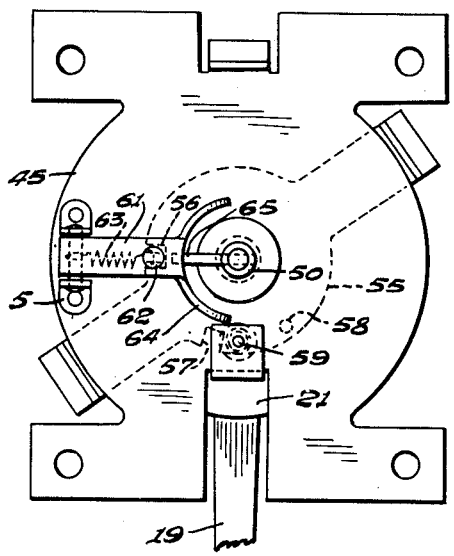
Figure 9 is a similar view of the rear plate to that shown in Figure 8, the parts thereof being shown as having been moved to right turn position of manual operation by the hand lever.

Referring more particularly to the drawings, the numeral 44 denotes a switch adapted to be mounted in the dash or instrument board of an automobile, not shown. The switch, which is electrically connected to front lamps 31 and 40, rear lamps 29 and 38 and pilot lights 27 and 36, comprises front and rear vertically disposed plates 47 and 45 respectively connected together in spaced relation by means of headed bolts 46' passing through spacing sleeves 46, nuts 14 being employed to tightly clamp the plates against the ends of the sleeves. The front plate supports front and rear pilot lamps 27 and 36 respectively, and a make and break rotary contact disk or member 21 is mounted on the outer face of the rear plate in a manner about to be described. All the respective lamps are connected together and to the switch in series so that when one front or rear light is switched on or off the other two respective lights will go on or off as the case may be.

The front and rear plates 47 and 45 of the switch are provided with centrally disposed registering openings 13 and 12' through which the respective stub shafts 43 and 50 extend for rotary movement. The inner opposing ends of these shafts are provided respectively with a bearing recess 43' and a reduced portion 51, the former receiving and serving as a bearing for the latter when the shafts 43 and 50 are independently rotated. A hand lever 42 connected to the outer end of the shaft 43 provides means for manually actuating the signals, and a lever 19 fixed on the outer end of the shaft 50, is operatively connected with the post 16 of steering wheel 15, by means of connecting rod 18 and lever 17, whereby the signals will be actuated by movement of the steering wheel, as will be more fully explained hereinafter.

The end of shaft 50 is held to its seat within the recess 43' by means of a coil spring 12 enclosed within a spacing sleeve or housing 11 surrounding the shaft, both the coil spring and sleeve bearing at opposite ends against washers 9 and 10. A lock nut 8 screwed on that end of the shaft formed with the reduced end 51 and adjacent to the latter serves to connect the parts together and prevent withdrawal of the shaft. A bushing 54 on the other or outer end of the shaft 50 and extending between the outer face of the plate 45 and the angular head 49 of the bolt, serves as a bearing for the make and break member 21. The lever 19 previously mentioned is formed with an angularly shaped opening 7 of similar shape to loosely receive the headed end of the shaft 50 so as to permit of a very slight independent rotary movement of the lever with respect to the head of shaft thereby permitting limited adjustment of the lever. A headed screw 53 extending through an arcuate slot 52 formed in the lever intermediate of its ends and screwing into the make and break member 21, clamps the lever in desired adjusted position.

Loosely mounted for rotation on the bushing 54 between the plate 45 and the make and break member 21 is a rocking plate 55 centrally apertured as at 13' for this purpose. The plate 55 is formed with two oppositely extending arms 1 and 2 secured to the angularly bent ends of which are what may be termed side brush supports 26'' and 34' respectively. A third or top brush support 6 is connected to the cut out bent portion 20 centrally located with respect to the top edge of the plate 45. These three brush supports are respectively provided with brushes 26, 34 and 24. Top brush 24 is always in engagement with the metal segmental contact member 25 carried by the make and break member 21, and side brushes 26 and 34 which are normally out of engagement with the contact strip are adapted for selective engagement therewith upon rotation of the member 21 in the appropriate direction, by means of the lever 19 and its steering wheel connections. It will be understood that movement of the lever 42 is not transmitted to the make and break member 21.

A lever 61, pivotally mounted in bracket 5, in turn secured to the inner face of the plate 45, carries a locking pin 62, which is normally forced outwardly through a radial slot 63' in the plate 45 and into the path of travel of notches 56 and 57 formed in the member 55, for a purpose hereafter explained. A second pin 59 mounted on plate 45 by means of a bracket 4, is forced by a coil spring 60 through a small opening 60' formed in the plate 45. This pin 59, when seated in detent 58 formed in the inner or front face of plate 55 resiliently holds the latter and the brushes 26 and 34 carried thereby in neutral position. The lever 61 which carries the pin 62 is formed at its free end with a cam 64 arranged in the path of travel of a pin 65 fixed to and projecting from the shaft 50, when the latter is rotated by lever 19 and its steering wheel connections.

Fixed to the shaft 43 is a lever 66 having an angularly bent arm 68 secured to the arm 2 of the rocking plate 55, as by means of a bolt 69. Coil springs 67, through lever 66 normally maintain rocking plate 55 in neutral or unlocked position, with the locking pin 62 engaging the plate 55 at a point midway between the notches 56 and 57.

Figure 10:
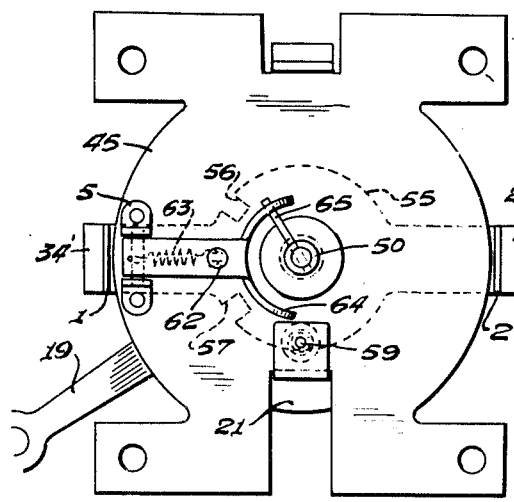
Figure 10 is a similar view showing the hand lever and cooperating switch mechanism as illustrated in Figure 9 after having been automatically released and returned to normal position by moving the steering mechanism and cooperating switch parts to right hand turn position.
Figure 11:
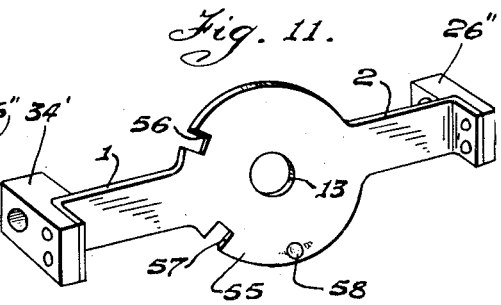
Figure 11 is a perspective view of the contact carrying member detached.

The operation of the device is as follows: Assuming that the operator is about to make a right hand turn and is desirous of indicating to drivers or others that such change of direction is contemplated, he moves the hand lever 42 to the right as illustrated in Figure 2. This movement of the hand lever imparts an anti-clockwise rocking movement through the lever 66 to the rocking plate 55, thus elevating the brush 26 into engagement with the contact plate 25, on the member 21. Current will then flow to the front and rear lamps 31 and 29 and the dash lamp 27 (all indicating right turn) from battery 22, which is grounded in the frame of the automobile, not shown, at its minus terminal as at 33' and is connected at its positive terminal to fixed brush 24, having constant engagement with contact plate 25. The flow of current is from brush 26, through line 26', pilot or dash light 27, then through line 28 to right rear lamp 29, from lamp 29 through line 30 to right front lamp 31 and from there through line 32 to ground 33. When the operating lever 42 has been moved to the right from neutral position as just described it will be locked in its adjusted position by means of the locking pin 62, which drops into the uppermost notch 56 in rocking plate 55 under the action of spring 63, as the lever 42 and plate 55 reach their limit of movement. As the driver turns the steering wheel 15 in a clockwise direction to make the indicated right turn, the lever 19 will be moved to the left as shown in Figures 3 and 10. This movement causes the make and break member 21 to rotate in a clockwise direction, bringing the pin 65 carried by the shaft 50 into engagement with the cam 64 on lever 61, thus moving the cam and pin 62 rearwardly sufficiently to disengage the pin from notch 56, whereupon the rocking plate 55 and lever 42 will move back to inoperative position under the action of the springs 67, the flow of current remaining the same as just described, as the brush 26 will remain in contact with the contact strip 25, due to the altered position of the member 21. As previously explained, pin 59, seats in detent or recess 58 on the plate 55, when the latter is returned to normal or neutral position, thus resiliently holding the plate in such position.

Assuming the driver wishes to turn to the left, he will turn the steering wheel in an anti-clockwise direction (either after or without preliminary signal by means of hand lever 42) thus causing the lever 19 to swing to the right or in an anti-clockwise direction. It might be stated here that the action of the hand lever 42 and plate 55 releasing mechanism, except for the change in the direction of movement of the operative parts, is the same in making either a right or left turn, it being noted that the cam 64 is in effect a double cam, consequently it seems unnecessary to repeat the operation. As the make and break brush 34, line 35 to left turn pilot light 36, rection in making a left turn, the contact plate 25 is moved into contact with the brush 34. Flow of current will then be through brush 34, line 35 to left turn pilot light 36, thence through line 37 to rear left turn lamp 38, from lamp 38 through line 39 to front left turn lamp 40 and thence to ground 33' through line 41. It will be noted that the lines are grounded in series so that when one light in the line goes out all go out.

From the foregoing it will be seen that automatic means is provided for returning the manually operable switch actuating lever and coacting parts to normal position through the operation of the steering mechanism and at the same time energize the same signals which had previously been energized manually, also that the manually given signals may be changed or corrected to correspond to the actual direction taken by the automobile, where the operator has either given an incorrect signal manually or finds it necessary to turn in a direction different from that previously contemplated.

What I claim as my invention is:

1. In a signal switch, a rigidly supported contact member, a pair of relatively movable switch members having coacting contacts and forming complemental parts of a switch, one of said switch members being continuously in contact with said rigidly supported contact member and each of said switch members being movable from a neutral position to opposite switch closing positions, manually operable means for moving one of said switch members in either direction from a neutral position for a switch closing action, means for locking the moved member when in switch closing position to some stationary part of said signal switch, and automatically operable means for actuating said other switch member for a switch closing action, and means for returning the first switch member, from switch closing to neutral position.

2. In a switch mechanism, a rigidly supported contact member, a pair of relatively movable switch members having coacting contacts and forming complemental parts of a switch, each of said members being movable from a neutral position to opposite thrown positions for a switch closing action through the other member, and the contact of one of said members having continuous electrical connection with said rigidly supported contact member, manually operable means for moving one of said members from its neutral to either of its thrown positions, locking means for locking one of said members when in thrown position, and automatically operable means for moving the other member from a neutral position to a thrown position, and vice versa, and in such movement of said automatically operated member to a thrown position releasing said locking means and returning the manually operable member, if thrown, to a neutral position, and relocking said latter member in said latter-named position.

3. In a signal switch, a rigidly supported contact, a rotary switch member having a contact surface in engagement with said rigidly supported contact, a second rotary switch member provided with a pair of spaced contacts for coaction with and normally out of engagement with the contact surface of the first-named switch member, means for moving the second-named switch member from a neutral position in one direction or the other to engage one or the other of said contacts with said contact surface of the first-named switch member, means for locking the second-named switch member in either of the opposite positions to which it is moved from a neutral position, retracting means energized by the movement of said second-named switch member to either one of said opposite positions for returning said second-named switch member to neutral position when unlocked from said locking means, and means for moving the first-named switch member in opposite directions from a neutral position to opposite working positions for bringing its contact surface into engagement with one or the other of said contacts and releasing the said locking means to permit the second-named switch member if moved out of neutral position to be returned to such position.

4. In a rigidly supported contact member, a signal switch, a pair of coaxially mounted rotary switch members, including electrical contact surfaces and movable to two opposite working positions from a neutral position, in each of which working positions each switch member forms a complemental switch couple with the other switch member, one of said rotary switch members being in continuous contact with said rigidly supported contact member, locking means for locking one of said members when moved to either of its working positions, manually operable means for moving said latter named switch member to either of its working positions, retracting means energized by movement of said manually operable switch member to working position for subsequently returning it to neutral position, automatic means for moving the other switch member to either of its working positions, and means operable with the automatically operated switch member to release said locking means so as to permit the manually operable switch member to be returned from a working position to a neutral position by said retracting means on movement of the automatically operable switch member to a working position and to permit subsequent relocking of said manually operable switch members in their respective neutral and working positions.

5. In a switch mechanism, an automatically operated rotary contact disk having a segmental contact plate, a rigidly mounted contact member engaging said contact plate, a rotatably mounted manually operable switch member having complemental contacts cooperating with said contact plate in relatively making electrical connections between said rigidly mounted contact member and the contact of said switch member, means to automatically rotate said contact disk, spring means for yieldingly holding said switch member in such position that its contacts are not in electrical connection with said rigidly mounted contact, means cooperating with said manually operable switch member to lock said member when manually shifted to an electrical connection of its contacts with said rigidly mounted contact and tripping means for said locking means coupled with said rotatable contact member.

6. In a switch mechanism, a rigidly supported contact member, a pair of relatively movable switch members having coacting contacts and forming complemental parts of a switch, one of said members coacting continuously with said rigidly supported contact member and each of said members being movable from a neutral position to opposite thrown positions for a switch closing action, manually operable means for moving one of said members from its neutral to either of its thrown positions, means for locking said latter member when in thrown position, and automatically operable means for moving the other member from its neutral to either of its thrown positions and vice versa, and means operated during such movement of said automatically operated member to a thrown position for releasing said locking means and returning the first named member, if thrown, to neutral position.

7. In a switch mechanism, a rigidly supported contact member, a pair of rotary coaxially mounted switch members, one having a contact surface continuously in contact with said rigidly supported contact member and the other having a pair of oppositely located contacts for contact with said contact surface, each of said members being movable from a neutral position to opposite thrown positions for a switch closing action, manually operable means for moving one of said members from its neutral to either of its thrown positions, means for locking one of said members when in thrown position, and automatically operable means for moving the other member from its neutral to either of its thrown positions, and vice versa, and means operative during such movement of said automatically operated member to a thrown position for releasing said locking means and returning the first named member, if thrown, to neutral position.

In testimony whereof I affix my signature.

PAUL WEIEN.